(12) United States Patent
Jakobsson et al.

(10) Patent No.: US 10,036,368 B2
(45) Date of Patent: Jul. 31, 2018

(54) CONTROL DEVICE FOR A YAW SYSTEM OF A WIND POWER PLANT

(71) Applicant: 2-B Energy Holding B.V., Hengelo (NL)

(72) Inventors: Johan Mikael Jakobsson, Grants Pass, OR (US); Huibertus Peels, Ootmarsum (NL)

(73) Assignee: 2-B Energy Holding B.V., Hengelo (NL)

( * ) Notice: Subject to any disclaimer, the term of this patent is extended or adjusted under 35 U.S.C. 154(b) by 93 days.

(21) Appl. No.: 14/764,734

(22) PCT Filed: Feb. 3, 2014

(86) PCT No.: PCT/EP2014/052068
§ 371 (c)(1),
(2) Date: Jul. 30, 2015

(87) PCT Pub. No.: WO2014/118375
PCT Pub. Date: Aug. 7, 2014

(65) Prior Publication Data
US 2015/0369213 A1    Dec. 24, 2015

(30) Foreign Application Priority Data
Feb. 1, 2013    (DE) .......... 10 2013 101 012

(51) Int. Cl.
| F03D 7/02 | (2006.01) |
| F03D 1/06 | (2006.01) |
| F16D 55/225 | (2006.01) |
| F03D 15/00 | (2016.01) |

(52) U.S. Cl.
CPC ......... *F03D 7/0244* (2013.01); *F03D 1/0675* (2013.01); *F03D 7/0204* (2013.01);
(Continued)

(58) Field of Classification Search
CPC .... F03D 7/0204; F03D 7/0244; F03D 7/0248; F03D 7/0264; F03D 7/0268; F03D 15/00;
(Continued)

(56) References Cited

U.S. PATENT DOCUMENTS 4,515,525 A * 5/1985 Doman ................ F03D 7/0204
416/11
4,966,525 A * 10/1990 Nielsen ............... F03D 7/0204
290/44

(Continued)

FOREIGN PATENT DOCUMENTS

| CN | 101571108 A | 11/2009 |
| DE | 69703622 T2 | 8/2001 |

(Continued)

OTHER PUBLICATIONS

International Search Report and Written Opinion for co-pending application No. PCT/EP2014/052068, dated Jun. 25, 2014.

*Primary Examiner* — Mark Laurenzi
*Assistant Examiner* — Xiaoting Hu
(74) *Attorney, Agent, or Firm* — Dinsmore & Shohl LLP (57) ABSTRACT

A control device for a yaw system of a wind turbine, of the type having a supporting structure and a machine support rotatably mounted on the supporting structure for rotation about a yaw axis, includes at least one adjusting device connected between the supporting structure and the machine support of the wind turbine. The at least one adjusting device includes a drivetrain having a drive element and a gear mechanism and at least one yaw brake operable to selectively rotationally fix the machine support on the supporting structure. The yaw brake engages between the drive element and the gear mechanism of the drive train of the adjusting device.

18 Claims, 5 Drawing Sheets

(52) U.S. Cl.
CPC ......... *F03D 7/0224* (2013.01); *F03D 7/0248* (2013.01); *F03D 7/0264* (2013.01); *F03D 7/0268* (2013.01); *F03D 15/00* (2016.05); *F16D 55/225* (2013.01); *F05B 2240/2213* (2013.01); *F05B 2260/40311* (2013.01); *F05B 2260/902* (2013.01); *F05B 2260/904* (2013.01); *F05B 2260/964* (2013.01); *Y02E 10/721* (2013.01); *Y02E 10/723* (2013.01)

(58) Field of Classification Search
CPC ............ F05B 2260/90; F05B 2260/902; F05B 2260/903; F05B 2260/904; F05B 2260/964
See application file for complete search history.

(56) References Cited

U.S. PATENT DOCUMENTS

| | | | |
|---|---|---|---|
| 6,176,675 B1 * | 1/2001 | Engstrom | F03D 7/0204 415/123 |
| 8,075,266 B2 | 12/2011 | Keller et al. | |
| 2004/0253093 A1 * | 12/2004 | Shibata | F03D 7/0204 415/4.1 |
| 2009/0058062 A1 | 3/2009 | Murakami et al. | |
| 2009/0232652 A1 * | 9/2009 | Keller | F03D 7/0204 416/1 |
| 2011/0243729 A1 | 10/2011 | Wolf | |

FOREIGN PATENT DOCUMENTS

| | | |
|---|---|---|
| DE | 202008010748 U1 | 10/2008 |
| EP | 2101058 A2 | 9/2009 |
| JP | 2000509780 A | 8/2000 |
| JP | 20042325000 A | 8/2004 |
| JP | 2011127551 A | 6/2011 |
| JP | 2012140885 A | 7/2012 |
| WO | 2003058062 A1 | 7/2003 |
| WO | WO-2011057664 A1 | 5/2011 |

\* cited by examiner

CONTROL DEVICE FOR A YAW SYSTEM OF A WIND POWER PLANT

FIELD OF THE INVENTION

The invention relates to a control device for a yaw system of a wind turbine, with at least one adjusting device connected between a supporting structure and a machine support rotatably mounted on the supporting structure about a yaw axis and comprising a drive element and a gear mechanism, and at least one yaw brake, by means of which the machine support can be fixed on the supporting structure.

BACKGROUND OF THE INVENTION

From DE 697 03 622 T2 a device for a wind turbine is known that is provided for the transmission and damping of yaw movements, wherein the device comprises a yaw bearing and a yaw movement rotational drive that permit a rotation of the machine installation about a vertical axis as well as a drive device for driving the machine installation about a vertical axis. In addition, a coupling is provided to transmit the torque of the drive device to the yaw movement rotational drive and is arranged so that the torque transmitted by the coupling is determined by the difference of the rotational movement speed of the drive shaft and output shaft of the coupling. The drive device has a brake, an electric motor that can be blocked by the brake and a gear mechanism coupled to the electric motor by interconnection of the coupling.

When the brake is in the locked position, a yaw movement produced by wind is damped by the coupling. In addition yaw brakes may be provided by means of which a yaw movement can be blocked. A blocking of the yaw movement is desired for example for safety reasons when maintenance staff are working on the machine installation and/or in the region of the machine support.

Conventional yaw brakes are arranged on the supporting structure and machine support interface, in particular on or in the region of the yaw bearing. Since the braking forces to be applied by the yaw brakes are large, the yaw brakes are designed correspondingly robustly, which is associated with not inconsiderable costs.

SUMMARY OF THE INVENTION

Starting from this background, the object of the invention is to be able to reduce the costs involved in blocking a yaw movement.

This object is achieved according to the invention by a control device as described herein.

The control device according to the invention, in particular for a yaw system of a wind turbine, has at least one adjusting device connected between a supporting structure and a machine support rotatably mounted on the supporting structure for rotation about a yaw axis. The control device has a drive element and a gear mechanism, in particular coupled to the machine support, and at least one yaw brake, by means of which the machine support can be fixed, in particular in a non-rotatable manner, on the supporting structure, wherein the yaw brake between the drive element and the gear mechanism engages the drive train of the adjusting device.

Between the drive element and the gear mechanism comparatively small braking forces are sufficient in order to block the gear mechanism and therefore also a rotation of the machine support about the yaw axis. The reason for this is the transmission ratio of the gear mechanism, which in particular is larger than one, preferably even larger than 100 or 1000. For this reason the yaw brake can be designed less robustly, whereby costs can be saved.

The gear mechanism is coupled in particular on the input side to the drive element and on the output side to the machine support or to the supporting structure. Preferably the gear mechanism comprises an input shaft coupled to the drive element and an output shaft coupled to the machine support or to the supporting structure. The gear mechanism is preferably a reduction gear. Advantageously the output shaft of the gear mechanism is rigidly coupled to the input shaft of the gear mechanism. In particular the gear mechanism is a gear train or gearbox.

Preferably the yaw brake engages on a shaft of the adjusting device, by means of which the gear mechanism can be coupled to or decoupled from the drive element. This shaft is formed for example by the input shaft of the gear mechanism or is rigidly connected to the later.

Preferably the drive element is an electrical drive. In particular the drive element is or comprises one or at least one electric machine, for example one or at least one electric motor. Alternatively the drive element can however also be a hydraulic drive or another drive.

An electrical power supply is advantageously provided, which forms in particular a power supply for the drive element. Preferably the drive element can be provided with electric current by means of the power supply. This applies particularly if the drive element is an electrical drive element, such as for example an electric motor. If the drive element is another type of drive, such as for example a hydraulic drive, then this too is preferably supplied, in particular indirectly, by the power supply. For example the hydraulic drive comprises at least one electrically operated hydraulic pump, which is preferably supplied with electric current by means of the power supply. Preferably the drive element can be supplied directly or indirectly with electric current by means of the power supply. In particular in the event of a failure of the power supply the drive element also fails. The power supply is provided for example by an electricity grid or network. Furthermore the power supply can include an emergency power supply. The electric current can be a direct current of an alternating current, in particular a three-phase current. The electricity grid is preferably an alternating current network, preferably a three-phase network.

A rotation or rotational movement of the machine support relative to the supporting structure about the yaw axis can preferably be controlled or regulated by means of the actuating device, in particular by means of the drive. Advantageously at least one controller is provided, by means of which the drive can be controlled or regulated. In particular the drive can be controlled or regulated, preferably by means of the controller, in such a way that a rotation or rotational movement of the machine support relative to the supporting structure about the yaw axis can be generated and/or braked and/or damped. The controller is preferably an electrical control device and is advantageously electrically connected to the drive. In particular the controller comprises one or at least one converter and/or frequency converter. Preferably the current that is fed to or can be fed to the drive can be controlled or regulated by means of the controller. Preferably the current intensity and/or amplitude and/or frequency and/or phase of this current can be controlled or regulated by means of the controller. In particular the controller can be supplied with electric current by means of the power supply.

A rotor that can be rotated by wind about a rotor axis is preferably rotatably mounted on the machine support. The rotor axis is preferably aligned transversely or approximately transversely to the yaw axis. In particular the rotor axis is aligned horizontally or approximately horizontally. Preferably the rotor axis is slightly inclined with respect to the horizontal. Advantageously the rotor is arranged on the leeward side of the machine support. Alternatively the rotor can however also be arranged on the windward side of the machine support.

The rotor preferably includes a rotor hub and one or more rotor blades mounted on the rotor hub, which in particular extend from the rotor hub transversely or approximately transversely to the rotor axis. Preferably the rotor blade or each of the rotor blades on the rotor hub is rotatably mounted about a blade axis, which in particular runs transversely or approximately transversely to the rotor axis. The number of rotor blades is preferably one, at least one, two, at least two, three or at least three. In particular the rotor blades are arranged uniformly distributed around the rotor axis.

The machine support preferably carries an electrical generator, which can be driven by the rotor. In particular the generator is connected to a rotor shaft of the rotor. A rotor gear mechanism can be connected between the generator and the rotor and/or between the generator and the rotor shaft.

The supporting structure comprises or preferably forms a tower, which in particular is anchored to a foundation or a footing in the ground or sea floor. The longitudinal axis of the supporting structure and/or of the tower preferably coincides with the yaw axis. In particular the yaw axis is aligned vertically or approximately vertically. The machine support is preferably arranged on the supporting structure.

The drive element preferably includes a drive shaft, which can be rotated in particular by means of the drive element. If the drive element is or comprises a motor or an electric motor, then the drive shaft is in particular the motor shaft of the motor or electric motor or for example a shaft that is rigidly connected to the motor shaft of the motor or electric motor. Furthermore the drive element preferably includes a stator and a rotor that can rotate relative to the latter, which includes in particular the drive shaft and/or is immovably or rigidly connected to the latter. The stator preferably comprises at least one, preferably several, electrical stator windings. The rotor preferably comprises at least one, preferably several, electrical rotor windings. The rotor can also be designed as a cage rotor, so that the rotor winding includes in particular several conducting bars, which are electrically connected to one another at their ends and are preferably short-circuited. In this case the drive element forms or includes for example an asynchronous machine. The drive element can also be designed as a permanent-field electric motor. In this case the rotor or the stator carries at least one, preferably several, permanent magnets, in particular instead of the respective winding or windings. The drive element is therefore preferably an electric motor, which is designed for example as a DC motor or as an AC motor, in particular as a three-phase motor.

The stator of the drive element is preferably fixed, in particular immovably or rigidly connected to the machine support or to the supporting structure. Preferably the drive element comprises a drive or motor housing immovably or rigidly connected to the stator and/or including the latter. Advantageously the drive or motor housing is firmly, in particular immovably, connected to the machine support or to the supporting structure.

The adjusting device preferably comprises an output shaft, which is connected or coupled, in particular rigidly, to the machine support or to the supporting structure. Advantageously a pinion gear is connected, in particular firmly or rigidly or elastically, to the output shaft, said pinion gear meshing and/or engaging with a ring gear, which is preferably connected firmly, in particular rigidly or torsionally stiffly or slightly rotationally, to the machine support or to the supporting structure. Advantageously the output shaft of the adjusting device is connected preferably rotationally elastically or firmly, in particular rigidly or torsionally stiffly, to the output shaft of the gear mechanism or is formed by the latter.

Preferably, the machine support can be rotated by the wind relative to the supporting structure about the yaw axis. Advantageously, the rotor is in this connection arranged on the leeward side of the machine support. In particular the yaw system is a passive yaw system.

According to a modification the drive can be operated, preferably by means of the controller, as a damper, by means of which a rotation or rotational movement of the machine support, caused in particular by wind, relative to the supporting structure about the yaw axis can be damped. This damper preferably forms an active damper. This term is understood in particular to mean that in the event of a power supply this damper is not functional and/or that the damping property of this damper and/or the damping of the or a rotational movement of the machine support relative to the supporting structure about the yaw axis can be controlled by means of the controller.

Preferably, a damping member is provided, by means of which or with the aid of which a rotational movement of the machine support, produced in particular by wind, relative to the supporting structure about the yaw axis can be damped. The damping member is preferably a passive damping member. This is understood to mean in particular that the damping member is capable of functioning also in the event of a power supply failure and/or that the damping property of the damping member and/or the damping of the or a rotational movement of the machine support relative to the supporting structure about the yaw axis cannot actively be controlled. Of course, the damping can be dependent on the speed and/or a speed change of the rotational movement of the machine support relative to the supporting structure about the yaw axis. The damping member is preferably incorporated in the drive train of the adjusting device. In particular the adjusting device includes the damping member. Preferably the damping member includes an input shaft and an output shaft.

Preferably, the damping member forms or includes a hydraulic damper. The hydraulic damper is for example a hydrodynamic coupling or visco-coupling. Preferably the damping member comprises an impeller with an impeller housing and an inner part rotatable in the latter, which is preferably firmly connected, in particular rigidly or torsionally stiffly, to one of the shafts of the damping member, for example to the output shaft of the damping member. The impeller housing is preferably firmly connected, in particular rigidly or torsionally stiffly, to another of the shafts of the damping member, for example to the input shaft of the damping member. Alternatively the inner part is for example firmly connected, in particular rigidly or torsionally stiffly, to the input shaft of the damping member, wherein the impeller housing is for example firmly connected, in particular rigidly or torsionally stiffly, to the output shaft of the damping member. The inner part is for example a propeller. Advantageously a fluid, in particular a hydraulic fluid, is provided in the housing. The damping member is preferably incorporated between the drive and gear mechanism.

According to a modification, the yaw brake engages between the damping member and the gear mechanism on the drive train of the adjusting device. Thus, the damping member, despite the yaw break having been actuated, can be prevented from allowing a rotation of the machine support relative to the supporting structure about the yaw axis.

Preferably, the yaw brake engages on a shaft of the adjusting device, by means of which the gear mechanism is coupled or can be coupled to the damping member. The shaft on which the yaw brake engages is formed for example by the input shaft of the gear mechanism or is rigidly connected to the later, and/or the shaft on which the yaw brake engages is formed for example by the output shaft of the damping member or is rigidly connected to the later. In particular, the shaft on which the yaw brake engages is arranged between the output shaft of the damping member and the input shaft of the gear mechanism and/or is connected between the output shaft of the damping member and the input shaft of the gear mechanism. In this case the shaft on which the yaw brake engages is connected, in particular rigidly, to the output shaft of the damping member and rigidly to the input shaft of the gear mechanism.

The drive train of the adjusting device and/or a part of this drive train can preferably be blocked by means of the yaw brake. The drive train and/or the part of the drive train that can be blocked by means of the yaw brake includes in particular the gear mechanism. For example the gear mechanism can be blocked by means of the yaw brake, in particular from its input side. Advantageously the shaft on which the yaw brake engages can be braked and/or blocked by means of the yaw brake.

The yaw brake is preferably a disc brake. Preferably the yaw brake comprises at least one brake disc and at least one brake body, which can be pressed against the brake disc. The brake body includes for example one or at least one brake shoe and/or one or at least one brake calliper and/or one or at least one brake disc and/or one or at least one brake lining. In particular the brake disc is rigidly connected to the gear train and/or to the part of the gear train that can be blocked by means of the yaw brake. Preferably the brake disc is rigidly connected to the shaft on which the yaw brake engages.

Preferably a braking arrangement is provided that comprises the yaw brake and the or a shaft on which the yaw brake engages. The braking arrangement is preferably connected, in particular via its shaft, between the drive and the gear mechanism, preferably between the damping member and the gear mechanism.

According to a modification, the yaw brake in the actuated state forms a slip clutch that allows a rotation of the machine support relative to the supporting structure about the yaw axis when a starting torque is reached or exceeded. Overloads that can cause damage to the machine support and/or the supporting structure and/or other components of the wind turbine can thereby be avoided.

According to a modification, a drive element brake is provided by means of which the drive element can be braked and/or blocked. Preferably the drive element brake is connected to the drive shaft, in particular firmly, preferably rigidly or torsionally rigidly. The drive element brake is advisable especially in combination with the damping member, so that when the drive is braked or blocked a damping of a rotational movement, in particular caused by wind, of the machine support relative to the supporting structure about the yaw axis is possible. Advantageously, in the event of a power supply failure the drive element can be braked and/or blocked, in particular automatically, by means of the drive element brake. The drive element brake is preferably pre-tensioned in the braking and/or blocking state, in particular by at least one spring. Advantageously the drive element brake can be changed by means of at least one electromagnet to the released state, in particular against the force of the spring. The electromagnet can for this purpose preferably be supplied with electric current, which in particular is available from the power supply. The drive element is preferably connected between the drive element brake and the damping member. If the drive element is a motor or electric motor, the drive element brake can also be termed an engine brake.

According to an embodiment the or a controller is connected, in particular electrically connected, to the drive, by means of which the drive can be controlled or regulated, especially if a power supply is available. Advantageously the or a rotation or rotational movement, caused in particular by wind, of the machine support relative to the supporting structure about the yaw axis can be damped by the drive. As already mentioned above, the drive is therefore used in particular not in order to turn the machine support, but preferably to damp the or a rotation or rotational movement of the machine support, produced by wind, relative to the supporting structure about the yaw axis. This is appropriate in particular if the rotor is arranged on the leeward side of the machine support. In this case the machine support can be rotated by the wind into a position in which the rotor axis is aligned parallel or approximately parallel to the wind direction. This functions in principle like a wind flag. The control device according to the invention preferably forms in this sense a damping device. Since turbulences, wind gusts, wind shear, etc., can lead to an unintended rotational movement of the machine support that turns the later from the desired position, such a rotational movement can be damped by means of the drive by producing a counter-torque. In the case of a power failure and/or if the drive is braked and/or blocked the damping member in particular performs this damping function. It is also possible to turn the machine support actively by means of the drive. The control device according to the invention forms in this sense in particular a drive device. This is appropriate for example to correct a relatively major yaw error or for maintenance purposes, for example in order to undo twisted lines running between the machine support and the supporting structure. Furthermore an active rotation of the machine support is appropriate if the rotor is arranged on the windward side of the machine support. Preferably the control device according to the invention forms a damping and/or drive device.

The drive train of the adjusting device includes in particular all components of the adjusting device with which a movement, preferably a rotational movement, can be transmitted or is transmitted between the drive element and the output side of the gear mechanism and/or the output shaft of the gear mechanism and/or the output shaft of the adjusting device. Preferably the gear train includes the gear mechanism and/or the input shaft of the gear mechanism and/or the output shaft of the gear mechanism and/or the drive shaft and/or the output shaft of the adjusting device and/or the damping member and/or the input shaft of the damping member and/or the output shaft of the damping member and/or the impeller.

The invention furthermore relates to a wind turbine with a supporting structure, a machine support rotatably mounted on the supporting structure about a yaw axis and at least one control device, which comprises at least one adjusting device connected between the supporting structure and the machine support and a drive element and a gear mechanism, coupled in particular to the later, and at least one yaw brake, by means of which the machine support can be fixed, in particular in a non-rotatable manner, on the supporting structure, wherein the yaw brake engages between the drive element and the gear mechanism on the drive train of the adjusting device. The control device is in particular control devices according to the invention that can be developed according to all modifications discussed in this connection. The wind turbine can be a windward rotor or a leeward rotor. Preferably the wind turbine is however a leeward rotor.

BRIEF DESCRIPTION OF THE FIGURES

The invention is described in more detail hereinafter with the aid of a preferred embodiment and with reference to the accompanying drawings, in which.

DETAILED DESCRIPTION OF THE INVENTION

Figure 1:
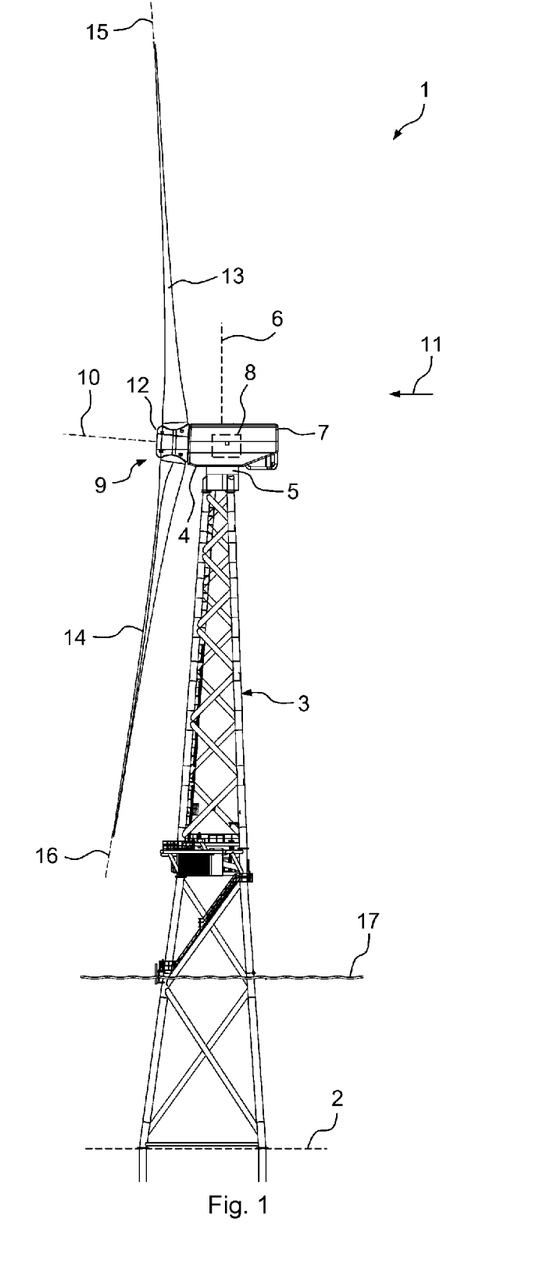
FIG. 1 is a schematic side view of a wind turbine.

FIG. 1 shows a schematic side view of a wind turbine 1, which is arranged in the sea and anchored to the sea bed 2. The water level of the sea is indicated schematically and identified by the reference numeral 17. The wind turbine 1 comprises a supporting structure 3 in the form of a lattice tower on which a machine support 4 can be rotatably mounted via an azimuth bearing 5 about a vertical yaw axis 6. The machine support 4 carries a machine housing 7, in which an electrical generator 8 is arranged. On the machine support 4 a rotor 9 is rotatably mounted about a rotor axis 10, which runs transversely or approximately transversely to the yaw axis 6. Preferably the rotor axis 10 is however inclined slightly relative to the horizontal. The rotor 9 comprises a rotor hub 12, on which two rotor blades 13 and 14 are rotatably mounted about their respective blade axis 15 and 16, the blade axes 15 and 16 running transversely or approximately transversely to the rotor axis 10. The rotor hub 10 is rigidly connected to a rotor shaft (not shown), by means of which the rotor 9 is connected to the generator 8. The rotor 9 is turned by the wind 11 about its rotor axis 10 and drives the generator 8.

Figure 2:
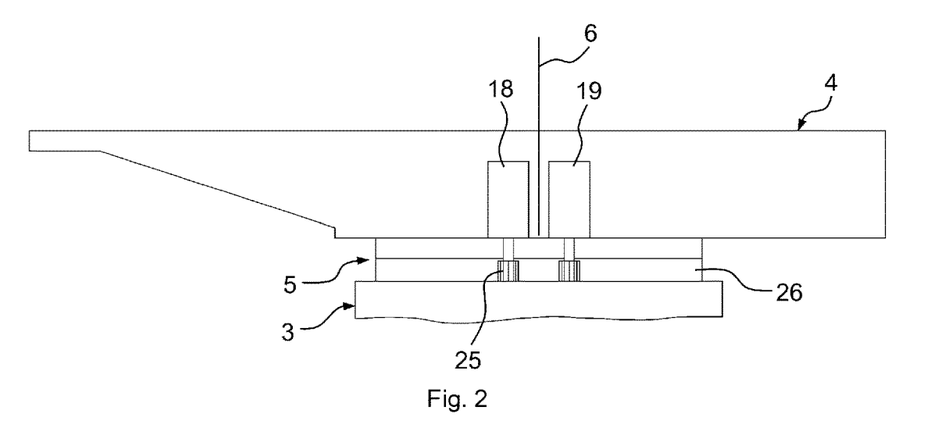
FIG. 2. Is a schematic side view of a machine support of the wind turbine according to FIG. 1 with two control devices according to an embodiment, of the present invention.
Figure 3:
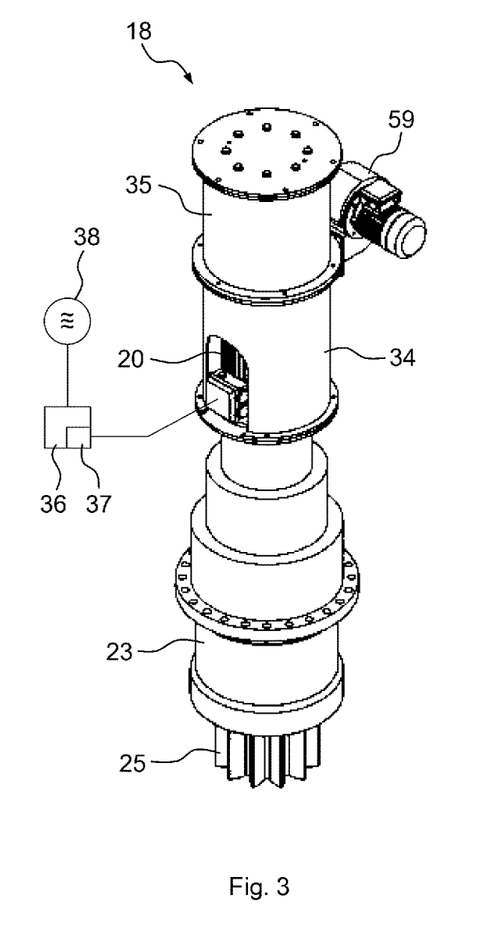
FIG. 3 is a perspective view of one of the control devices according to FIG. 2.
Figure 4:
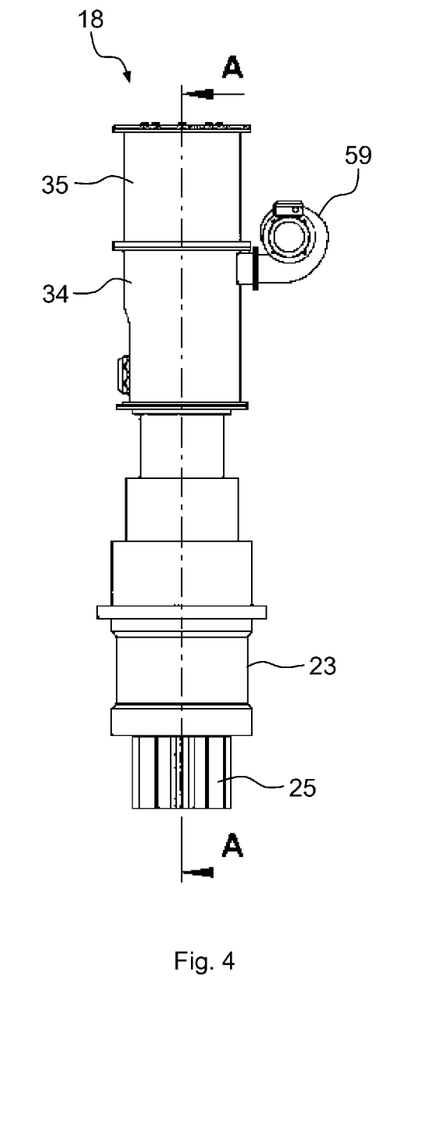
FIG. 4 is a side view of the control device according to FIG. 3.

FIG. 2 shows a schematic side view of the machine support 4, on which are secured two control devices 18 and 19 according to an embodiment of the invention. The control devices 18 and 19 are constructed similarly, a perspective view of the control device 18 being visible in FIG. 3. Furthermore a side view of the control device 18 is provided in FIG. 4 and a schematic sectional view of the control device 18 along the line of intersection A-A illustrated in FIG. 4 is visible in FIG. 5.

The control device 18 comprises an electric motor 20, whose motor shaft 21 can rotate about an axis 54 and is connected by a damping member, in the form of a hydraulic damper 28, and a braking device 44 to an input shaft 22 of a gear mechanism 23. An output shaft 24 of the gear mechanism 23 is rigidly connected to a pinion gear 25, for example directly or by a coupling member. Alternatively the output shaft 24 can also be connected, especially by a coupling member, in a torsionally flexible manner to the pinion gear 25. The pinion gear 25 meshes with a ring gear 26 (see FIG. 2), which is rigidly connected to the supporting structure 3 and is provided in the upper end region of the supporting structure 3. The motor shaft 21 is connected via its end remote from the damper 28 to a motor brake 27, which comprises at least one electromagnet 29 by means of which the brake 27 is held in the released state against the force of a spring 39 as long as a sufficiently large electric current flows through the electromagnet 29. If the current fails, the brake 27 automatically adopts its braking state evident in FIG. 5 and blocks the motor shaft 21 of the electric motor 20. The electric motor 20 comprises a motor housing 31, which forms a stator of the electric motor 20 and includes electrical stator windings 40. Furthermore the motor shaft 21 includes electrical rotor windings 41 and forms a rotor of the electric motor 20. In addition the gear mechanism 23 includes a gear mechanism housing 32, the damper 28 includes a damper housing 33, the brake 27 includes a brake housing 42 and the brake device 44 includes a housing 43. According to the embodiment, the electric motor 20 is furthermore arranged in a first outer housing 34, the brake 27 being arranged in a second outer housing 35. A ventilation fan 59 is provided on the first outer housing 34, by means of which the electric motor 20 is cooled. Alternatively the outer housings 34 and 35 can however also be formed by a common outer housing, or can be omitted. If the outer housings 34 and 35 form a common outer housing, then this is ventilated in particular with a fan. Furthermore the housing 34 can also include the damper 28 and optionally the brake device 44. The housings 31, 32, 33, 34, 35, 42 and 43 are rigidly connected to one another. In addition these housings are rigidly connected to the machine support 4.

Figure 5:
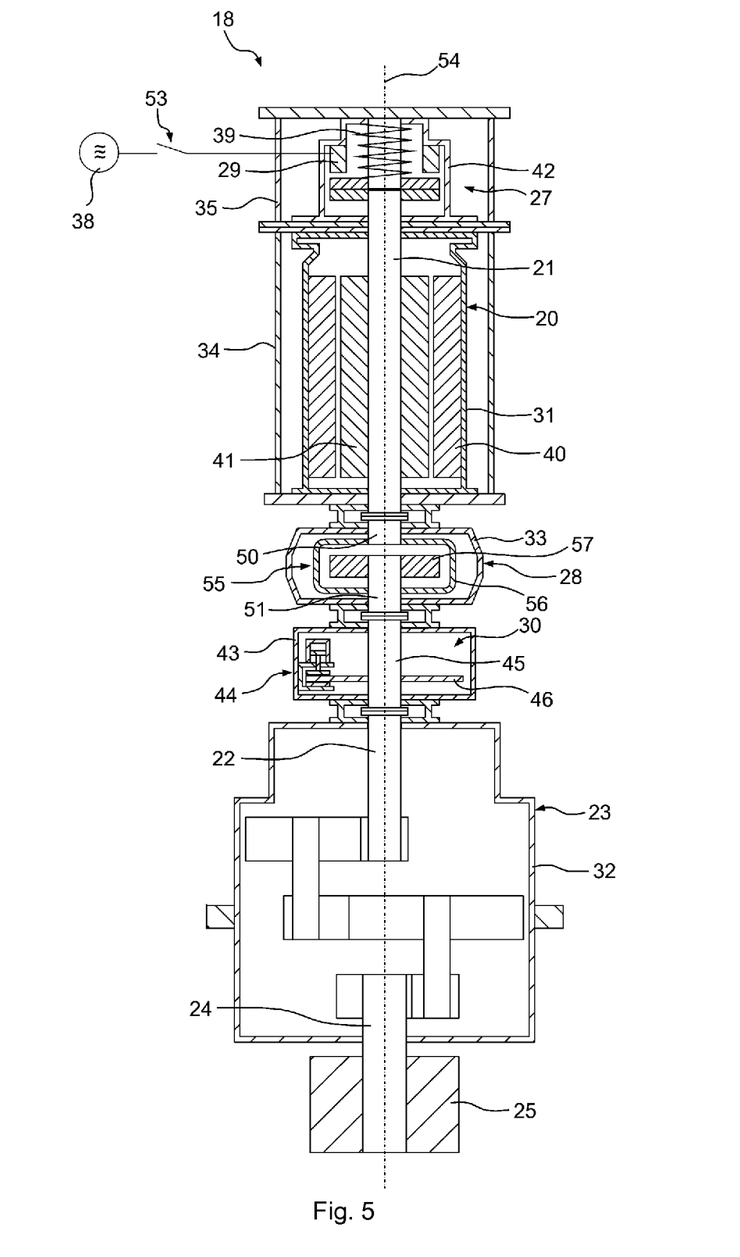
FIG. 5 is a schematic sectional view of the control device along the line of intersection A-A visible in FIG. 4.

The electric motor 20 is connected via a controller 36, which includes a frequency converter 37, to an electricity grid or network 38. The electricity grid 38 forms a power supply for the controller 36 and the electric motor 20. Furthermore the electromagnet 29 is or can be fed with current from the electricity grid 38.

If the wind 11 alters its direction, the machine support 4 follows this change in direction and turns about the yaw axis 6. Since the wind turbine 1 is designed as a downwind turbine, the machine support 4 behaves roughly like a wind flag. In particular the machine support 4 attempts to align itself so that the rotor axis 10 is aligned in the wind direction 11. During this rotation, which is also termed yawing, the pinion gear 25 is rotated, which via the interconnection of the gear mechanism 23, the brake device 44 and the damper 28, turns the motor shaft 21. The electric motor is triggered in such a way by means of the controller 36 that this rotational movement is damped. This is advantageous since abrupt changes in wind direction can lead to powerful loads acting on the wind turbine 1. Furthermore an excessive swinging of the machine support 4 can be avoided or at least reduced by the damping. The controller 36 matches the damping in such a way that the loading of the wind turbine 1 is kept as low as possible. The electric motor 20, the gear mechanism 23 and the controller 36 together form an actuating device. Furthermore the damper 28 and/or the brake device 44 can be counted as part of the actuating device.

If the grid 38 fails, then a controlled damping of the yaw movement of the machine support 4 can no longer be achieved through the controller 36 in cooperation with the electric motor 20. Since however also the electromagnet 29 is supplied via the grid, in the event of a failure of the grid 38 the electromagnet 29 also fails, so that the motor shaft 21 is automatically blocked by the brake 27. A damping of a yaw movement of the machine support 4 caused in particular by wind is however even with a blocked motor shaft 21 still ensured by the damper 28. Although the damper 28 is a passive damper, so that the damping achieved by it cannot always be adjusted optimally, nevertheless it is possible with the damper 28 to avoid powerful loadings of the wind turbine 1 and too large an excessive swing of the machine support 4 in wide ranges.

When the grid 38 is restored, current flows through the electromagnet 29 and frees the motor shaft 21 once again. In addition the controller 36 resumes operation and controls the damping of the yaw movements of the machine support 4.

It is however also possible with the existing power supply 38 to block the motor shaft 21 by means of the brake 27, especially if current no longer flows in a sufficient amount through the electromagnet 29. For example the electromagnet 29 can for this purpose be disconnected from the power supply 38 by means of a schematically illustrated switch 53. In this case the electric motor 20 is preferably not triggered by the controller 36. A blocking of the motor shaft 21 with the existing power supply is appropriate for example if the machine support 4 is to remain in a certain position relative to the supporting structure 3. A damping of a yaw movement of the machine support 4 caused in particular by wind can then be ensured by the damper 28.

On account of the damper 28, even if the motor shaft 21 is blocked, movements of the machine support 4 about the yaw axis 6 are still possible however. In some cases, it may however be appropriate also to suppress these movements. For this purpose the brake device 44 is provided, by means of which the machine support 4 can be fixed, in particular in a rigid manner, to the supporting structure 3. The brake device 44 includes a yaw brake 30 and a shaft 45 on which the yaw brake 30 engages. The shaft 45 is connected between an output shaft 51 of the damper 28 and the input shaft 22 of the gear mechanism 23 and is rigidly connected to the output shaft 51 of the damper 28 and also to the input shaft 22 of the gear mechanism 23. It is however also possible for the shaft 45 to be formed by the output shaft 51 of the damper 28 or by the input shaft 22 of the gear mechanism 23. In particular it is possible for the shaft 45 and the output shaft 51 of the damper 28 to be formed by the input shaft 22 of the gear mechanism 23. Furthermore an input shaft 50 of the damper 28 is rigidly connected to the motor shaft 21.

Figure 6:
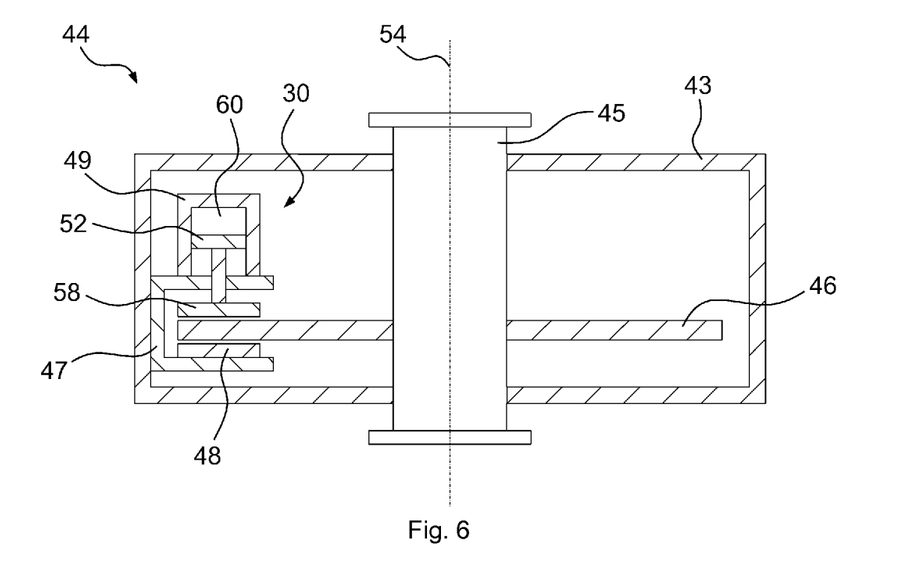
FIG. 6 is a schematic sectional view of the brake device visible in FIG. 5.

An enlarged representation of the brake device 44 is also shown in FIG. 6. The yaw brake 30 comprises a brake disc 46 rigidly connected to the shaft 45, a brake calliper 47 with a first brake pad 48 moveably mounted on the housing 43, and a hydraulic brake cylinder 49 with brake piston 52, to which a second brake pad 58 is fixed. The brake cylinder 49 comprises a chamber 60, into which hydraulic fluid is introduced under pressure to actuate the yaw brake 30, so that the brake piston 52 moves and the brake pad 58 presses against one side of the brake disc 46. The brake calliper 47 is thereby also moved and forces the brake pad 48 against the other side of the brake disc 46. The yaw brake 30 is designed in this case as a hydraulically actuated floating calliper brake, whose brake support plate is formed by the housing 43. Alternatively the yaw brake may can be actuated electrically or pneumatically. Furthermore the yaw brake can be designed as a fixed calliper brake. It is also possible for the yaw brake to include several brake discs.

The damper 28 includes an impeller 55 with an impeller housing 56 rigidly connected to the input shaft 50 of the damper 28 and an inner part 57 rotatable in the housing, which is rigidly connected to the output shaft 51 of the damper 28. Furthermore a hydraulic fluid is introduced into the impeller housing 56. Preferably the damper 28 also includes a brake, by means of which the impeller housing 56 can be blocked automatically in the event of a failure of the power supply 38. It is therefore possible to activate automatically the damping function of the damper in the event of a failure of the power supply 38. The brake of the damper 38 can be provided alternatively or in addition to the brake 27.

In particular at least the two control devices 18 and 19 are present. Advantageously additional control devices may however also be present, so that a more powerful damping or braking force can be applied. Preferably all the controller 36 are connected as a network so that if a more powerful damping or braking force is required, additional control devices can be switched on. If a weaker damping or braking force is sufficient, which can be applied for example with simply one or two control devices, the additional control devices can be deactivated.

LIST OF REFERENCE NUMERALS

1 Wind turbine
2 Sea bed
3 Supporting structure
4 Machine support
5 Azimuth bearing
6 Yaw axis
7 Machine housing
8 Electric generator
9 Rotor
10 Rotor axis
11 Wind
12 Rotor hub
13 Rotor blade
14 Rotor blade
15 Blade axis
16 Blade axis
17 Water level
18 Control device
19 Control device
20 Electric motor
21 Motor shaft
22 Input shaft of the gear mechanism
23 Gear mechanism
24 Output shaft of the gear mechanism
25 Pinion gear
26 Ring gear
27 Motor brake
28 Damper
29 Electromagnet
30 Yaw brake
31 Motor housing
32 Gear mechanism housing
33 Damper housing
34 First outer housing
35 Second outer housing
36 Controller
37 Frequency converter
38 Electricity grid/power supply
39 Spring of the motor brake 40 Stator winding
41 Rotor winding
42 Brake housing
43 Housing of the brake device
44 Brake device
45 Shaft of the brake device
46 Brake disc
47 Brake calliper
48 First brake pad
49 Brake cylinder
50 Input shaft of the damper
51 Output shaft of the damper
52 Brake piston
53 Electric switch
54 Axis
55 Impeller for the damper
56 Impeller housing of the damper
57 Inner part of the damper
58 Second brake pad
59 Cooling fan
60 Chamber of the brake cylinder

The invention claimed is:

1. A control device for a yaw system of a wind turbine of the type having a supporting structure and a machine support rotatably mounted on the supporting structure for rotation about a yaw axis, the control device comprising:
    at least one adjusting device connected between the supporting structure and the machine support of the wind turbine, the at least one adjusting device comprising:
        a drivetrain having a drive element and a gear mechanism;
        a passive damping member connected between the drive element and the gear mechanism, the passive damping member damping rotational movement of the machine support relative to the supporting structure about the yaw axis;
        at least one yaw brake operable to selectively rotationally fix the machine support on the supporting structure, the yaw brake engaging between the passive damping member and the gear mechanism of the drive train of the adjusting device; and
        a drive element brake operable to selectively block the drive element;
    wherein the drive element is operable as an active damper, by means of which a rotation movement of the machine support, caused by wind, relative to the supporting structure about the yaw axis is damped.

2. A control device according to claim 1, wherein the drive element is an electrical drive element operable to damp the rotational movement of the machine support relative to the supporting structure about the yaw axis by producing a counter-torque to the machine support.

3. A control device according to claim 2, wherein the drive element brake is operable to automatically block the drive element in the event of a power supply failure.

4. A control device according to claim 3, wherein the passive damping member comprises a hydraulic damper.

5. A control device according to claim 1, wherein the yaw brake is operable to selectively block the drivetrain in order to selectively rotationally fix the machine support on the supporting structure.

6. A control device according to claim 5, further comprising a shaft coupling the drive element to the gear mechanism, the yaw brake engaging the shaft.

7. A control device according to claim 1, further comprising a shaft coupling the drive element to the gear mechanism, the yaw brake engaging the shaft.

8. A control device according to claim 7, wherein the yaw brake comprises at least one brake element rigidly connected to the shaft and at least one brake body that can be pressed against the brake element.

9. A control device according to claim 8, wherein the at least one brake element comprises at least one brake disc.

10. A control device according to claim 1, wherein the yaw brake in an activated state forms a slip clutch, which allows a rotation of the machine support relative to the supporting structure about the yaw axis when an initial torque is reached or exceeded.

11. A control device according to claim 1, wherein the drive element brake automatically blocks the drive element in the event of an electrical power supply failure.

12. A control device according to claim 1, wherein the drive element comprises an electric motor.

13. A control device according to claim 1, wherein the damping is dependent on a change of speed or change of velocity of the rotational movement of the machine support relative to the supporting structure about the yaw axis.

14. A control device according to claim 1, wherein the drive element is operable to turn the machine support.

15. A control device according to claim 1, wherein the wind turbine is a leeward rotor.

16. A control device according to claim 15, wherein the machine support is rotatable by the wind into a position in which an axis of the rotor is aligned parallel or approximately parallel to a direction of the wind.

17. A control device according to claim 16, wherein the control device is a damping device.

18. A control device according to claim 1, further comprising a controller controlling the drive element such that the drive element is operable as the active damper.

* * * * *